US012792959B2

(12) United States Patent
Sherif et al.

(10) Patent No.: US 12,792,959 B2
(45) Date of Patent: Nov. 10, 2026

(54) SYSTEMS AND METHODS FOR USING RESOURCE MANAGEMENT COMMUNICATIONS PLATFORMS TO GENERATE TIME-SENSITIVE NOTIFICATIONS BASED ON REAL-TIME DATA

(71) Applicant: Capital One Services, LLC, McLean, VA (US)

(72) Inventors: Timur Sherif, Silver Spring, MD (US); Eric Eppler, Baltimore, MD (US)

(73) Assignee: Capital One Services, LLC, McLean, VA (US)

(*) Notice: Subject to any disclaimer, the term of this patent is extended or adjusted under 35 U.S.C. 154(b) by 910 days.

(21) Appl. No.: 18/184,647

(22) Filed: Mar. 15, 2023

(65) Prior Publication Data

US 2024/0311683 A1 Sep. 19, 2024

(51) Int. Cl.
*G06N 20/00* (2019.01)
*G06F 40/279* (2020.01)

(52) U.S. Cl.
CPC ........... *G06N 20/00* (2019.01); *G06F 40/279* (2020.01)

(58) Field of Classification Search
USPC ........................................................... 705/35
See application file for complete search history.

(56) References Cited

U.S. PATENT DOCUMENTS

| | | | | |
|---|---|---|---|---|
| 2016/0086241 | A1* | 3/2016 | Proulx | G06F 3/0481 705/26.4 |
| 2018/0253659 | A1* | 9/2018 | Lee | H04L 51/42 |
| 2019/0075069 | A1* | 3/2019 | Kumar | H04L 51/222 |
| 2023/0235495 | A1* | 7/2023 | Miles | D06F 34/08 8/137 |

* cited by examiner

*Primary Examiner* — David R Vincent
(74) *Attorney, Agent, or Firm* — Foley & Lardner LLP

(57) ABSTRACT

Methods and systems are described herein for novel uses and/or improvements to artificial intelligence applications. As one example, methods and systems are described herein for enabling a resource management communications platform (e.g., an artificial-intelligence-based chatbot application) to intervene at opportune moments to reduce the likelihood that a user performs an undesirable action, while also minimizing the inconvenience to the user. For example, the system may identify implicit user information based on previous notifications and the characteristics of those notifications. Characteristics of previous notifications may include response times from the user.

18 Claims, 4 Drawing Sheets

400

SYSTEMS AND METHODS FOR USING RESOURCE MANAGEMENT COMMUNICATIONS PLATFORMS TO GENERATE TIME-SENSITIVE NOTIFICATIONS BASED ON REAL-TIME DATA

BACKGROUND

In recent years, the use of artificial intelligence (AI), including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be a difficult, time-consuming, and manual task. These technical problems may present an inherent problem with attempting to use an artificial-intelligence-based solution in anticipating an undesirable action and intervening at an opportune moment to maximize the likelihood the undesirable action will be mitigated and minimize undesirable consequences without causing inconvenience to the user because there is likely to be little training data (or high-quality training data) that can be used to anticipate the undesirable action.

SUMMARY

Methods and systems are described herein for novel uses and/or improvements to artificial intelligence applications. As one example, methods and systems are described herein for enabling a resource management communications platform (e.g., an artificial-intelligence-based chatbot application) to intervene at opportune moments to reduce the likelihood that a user performs an undesirable action while also minimizing the inconvenience to the user. For example, the system may identify implicit user information based on previous notifications and the characteristics of those notifications. Characteristics of previous notifications may include response times from the user.

Existing systems may lack high-quality training data and/or a manner of obtaining training data that is based on personalized interactions with users, have a limited context of a user's complete situation for the recommendations, or experience limited engagement from users. Furthermore, artificially creating training data that mimics this information is difficult to generate.

To overcome these technical deficiencies in adapting artificial intelligence models for this practical benefit, methods and systems train an artificial intelligence model on data that may indirectly indicate when notification will be least likely to inconvenience the user. Specifically, the methods and systems are trained on training data that is based on the user's response times from previous notifications and the characteristics of those notifications. By using this data, the system may determine the likelihood that a user will feel inconvenienced by a similar notification. For example, the model may compare the user's response times from previous notifications and the characteristics of those notifications to better intervene in similar situations in the future and to generate an output that will help the system assess the probability a notification is effective for a specific action. Accordingly, the methods and systems may provide the practical benefit of enabling a resource management communications platform to intervene at opportune moments to reduce the likelihood that a user performs an undesirable action while also minimizing inconvenience to the user.

In some aspects, methods and systems are designed to generate time-sensitive notifications based on real-time data that reduce inconvenience to users. The system may receive first real-time data indicating a first action, determines a first attribute for the first action, generates a feature input for an artificial intelligence model, wherein the feature input is based on the first attribute, and wherein the artificial intelligence model is trained to prioritize notifications based on detected actions based on a comparison of inputted attributes and user response times to the notifications corresponding to the inputted attributes, inputs the feature input into the artificial intelligence model to generate a first output, determines whether to generate a first notification for the first action based on comparing the first output to a first threshold, and generates for display, on a user interface, the first notification in response to determining that the first output equals or exceeds the first threshold.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
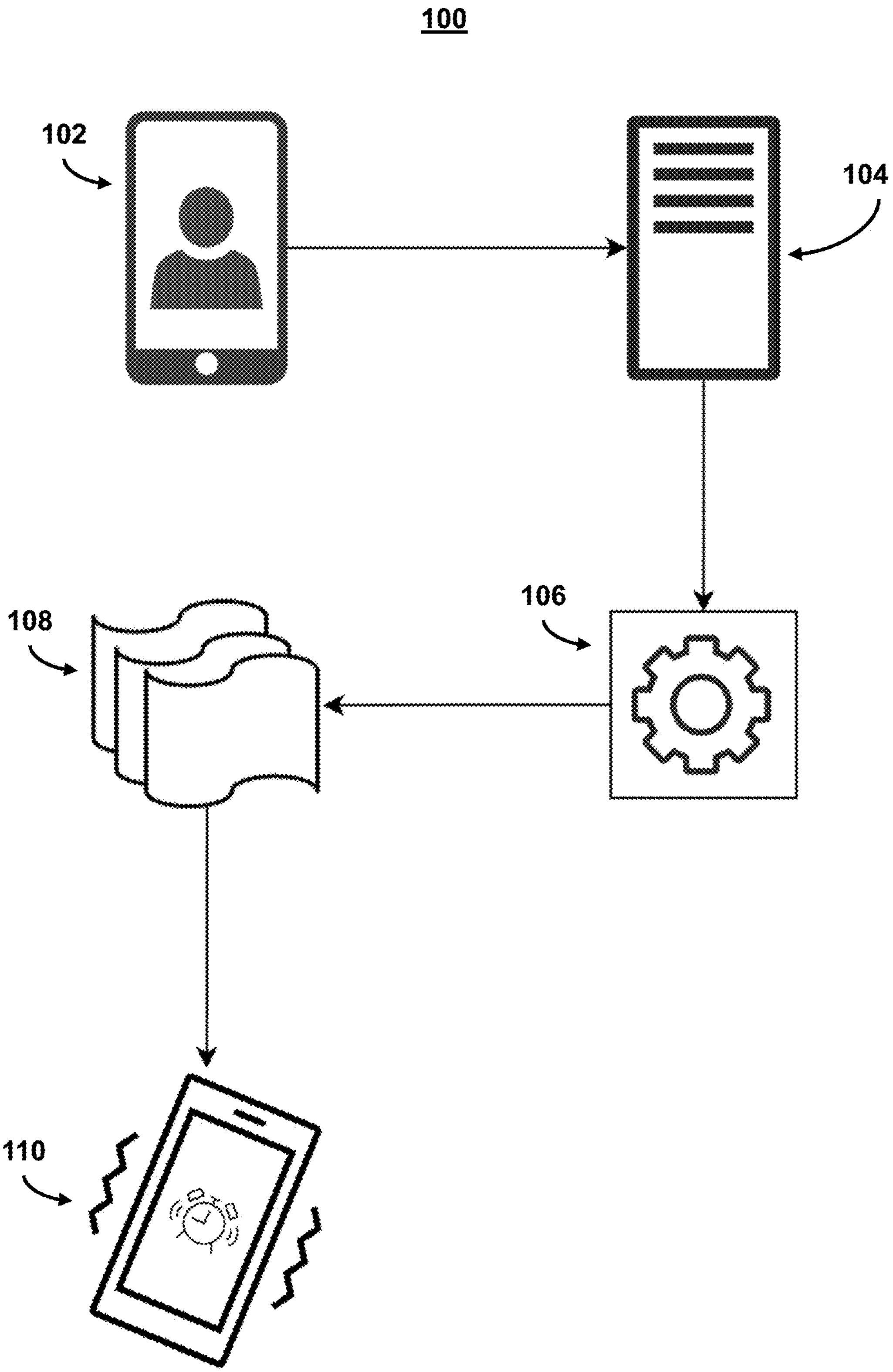
FIG. 1 shows an illustrative diagram for a system that intervenes at opportune moments to reduce the likelihood that a user performs an undesirable action while also minimizing inconvenience to the user, in accordance with one or more embodiments.

FIG. 1 shows an illustrative diagram for a system that intervenes at opportune moments to reduce the likelihood that a user performs an undesirable action while also minimizing inconvenience to the user, in accordance with one or more embodiments. For example, system 100 may include user device 102, which performs an action. System 100 may include server 104 which receives the action from user device 102 and determines one or more attributes corresponding to the action. Server 104 may generate a feature input for an artificial intelligence model. Server 104 may use the attribute of the action to generate the feature input. System 100 may include artificial intelligence model 106. Artificial intelligence model 106 may be trained to prioritize notifications based on detected actions based on a comparison of inputted attributes and user response times to the notifications corresponding to the inputted attributes. Artificial intelligence model 106 receives input from server 104. Artificial intelligence model 106 may generate an output 108. Output 108 may be used in determining whether to generate a notification for the action based on comparing the output to a threshold. System 100 may generate for display, on a user interface, notification 110 in response to determining that the first output equals or exceeds the threshold. Generating a notification in response only if the output equals or exceeds the threshold may help reduce the chance the notification causes inconvenience to the user and increases the likelihood that the user will respond positively to the notification. Increasing the likelihood that the user will respond positively to the notification may have the added benefit of reducing the likelihood that a user performs an undesirable action. For example, FIG. 1 illustrates a model that trains itself to compare the user's response times from previous notifications and the characteristics of those notifications. For example, the model may compare the user's response times from previous notifications and the characteristics of those notifications to better intervene in similar situations in the future and to generate an output that will help the system assess the probability a notification is effective for a specific action. As such, the system may provide the practical benefit of enabling a resource management communications platform to intervene at opportune moments to reduce the likelihood that a user performs an undesirable action while also minimizing inconvenience to the user.

The system may be used to generate a feature input. In disclosed embodiments, a feature input should be understood to mean an input in a machine learning model. For example, the feature input may be a set of data input into a machine learning model that returns an output.

In disclosed embodiments, a user interface may comprise a human-computer interaction and communication in a device and may include display screens, keyboards, a mouse, and the appearance of a desktop. For example, a user interface may comprise a way a user interacts with an application or a website.

In disclosed embodiments, content should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or a combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

The system may monitor content generated by the user to generate user profile data. In disclosed embodiments, a user profile and/or user profile data may comprise data actively and/or passively collected about a user. For example, the user profile data may comprise content generated by the user and a user characteristic for the user. A user profile may be content consumed and/or created by a user.

User profile data may also include a user characteristic. In disclosed embodiments, a user characteristic may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

The system may be used to receive data such as an action. In disclosed embodiments, an action may include actions that are undesired or irresponsible as well as desired or responsible. For example, an action may include actions that prioritize immediate gratification over long-term financial stability. Alternatively, an action may include actions that promote long-term financial stability. For example, an undesired action may include making impulse purchases, spending recklessly on nonessentials, or lack of savings, whereas a desired action may be paying off debt, making investments, or creating a retirement account.

The system may be used to receive real-time data. In some embodiments, real-time data may include account balances that are updated with a high frequency. In some embodiments, data delivered in real-time may be data delivered immediately or with very low latency. In some embodiments, data delivered in real-time may be data delivered with a very high frequency. Real-time data may help the system operate with more efficiency and improve the likelihood of user response.

In some embodiments, the system may determine an action by monitoring the account details of a user or analyzing additional data provided by the user (e.g., sensor access, receipts, communication applications, or other information pertinent to detecting user actions). For example, by determining that a user made an abnormally large purchase, the system may generate a notification corresponding to the action.

The system may be used to identify an attribute of an action. In disclosed embodiments, an attribute of an action may include data or additional information about an action. The attribute of an action may be used to correlate the action with other actions that share similar attributes. For example, in disclosed embodiments, an attribute may be "time-sensitive." Time-sensitive may refer to the importance of completing a transaction within a specific timeframe to avoid the negative consequences of missing a payment (e.g., making a payment on a loan). In some embodiments, the attribute may be "high-risk." High-risk may refer to a financial decision that will likely result in a financial loss or negative impact on the user (e.g., spending more money than the user has access to). In some embodiments, the attribute may be a "repeated action." A repeated action may refer to a subscription service that the user could potentially forget about. In some embodiments, the attribute may be a "one-time purchase." A one-time purchase may refer to an action that indicates the user may make a purchase with no expectation of future payments or transactions for continued access or use. For example, an action with the a "one-time purchase" attribute may be purchasing a book or a computer. For example, the attribute may be "service-based." Service-based may refer to an action that indicates the user made a payment for a service such as routine car maintenance. For example, the attribute may be "potentially unnecessary." A potentially unnecessary purchase may refer to an action that indicates a user made an atypical purchase at a luxury store. For example, the attribute may be "potentially fraudulent." Potentially fraudulent may refer to an action that indicates an unfair transaction. The attribute may allow the system to generate an input for an artificial intelligence model.

In some embodiments, the system may determine an attribute by identifying the characteristics of an action. For example, the system may identify characteristics of an action such as "time-sensitive" and "high-risk" for an action such as a missed mortgage payment which could pose undesirable consequences to the user and needs to be remedied quickly. By determining that an action is time-sensitive or high-risk, the system may generate a notification accordingly.

The system may generate a notification in response to determining that the first output equals or exceeds the first threshold. In disclosed embodiments, a notification may include a description of the undesired action and/or an explanation of the undesired consequences stemming from an undesired action. The notification may also include proposed desired actions. For example, the system may generate a notification that includes a recent undesired action (e.g., user withdrew a large amount of cash from an ATM), the undesired consequences (e.g., experiencing overdraft fees, damaging credit score, or inability to pay for unexpected costs), as well as a desired action (e.g., maintaining a balance such that there is enough money in the account to cover unexpected costs and reduce the risk of overdraft fees and missed payments).

In some embodiments, the system may determine to generate a notification by comparing the output of the model with a threshold value. For example, by determining that the output equals or exceeds the threshold, the system may generate a notification. By generating the notification, the system may reduce the likelihood a user performs an undesired action or may reduce the undesired consequences a user experiences as a result of performing an undesired action.

The system may take into consideration a user response time to notifications. In disclosed embodiments, a user response time may include a metric that measures the amount of time it takes for a user to respond to a notification from the system. The user response time may be measured from the moment a user receives the notification to the moment the user responds to the notification.

In some embodiments, the system may determine a user response time by tracking the time it takes a user to respond to a notification. For example, by determining a user response time, the system may be able to draw inferences about the user. For example, the user may be apprehensive about addressing a notification, which may present as an abnormally long response time.

Figure 2:
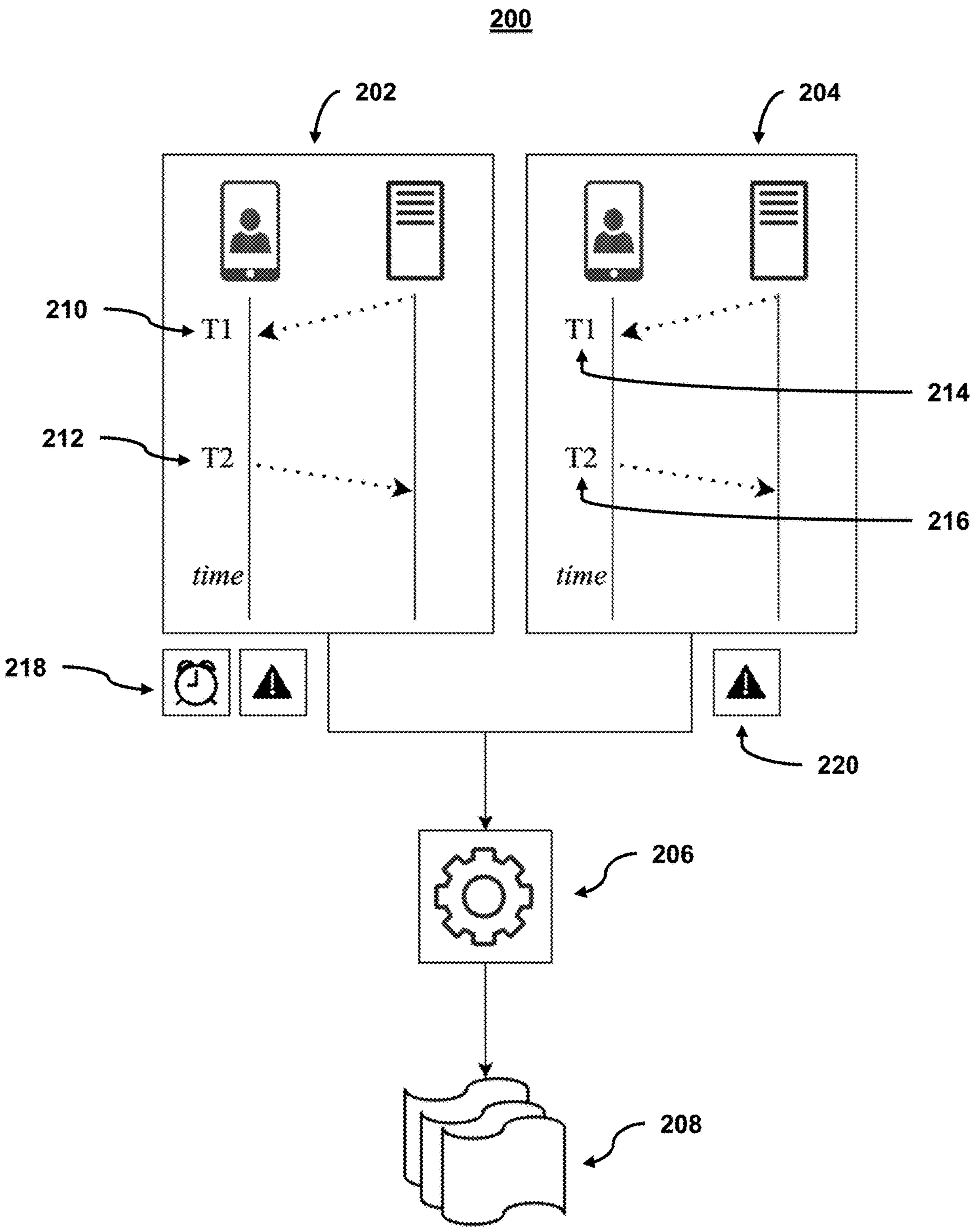
FIG. 2 shows an illustrative diagram of a model that trains itself to compare the user's response times from previous notifications and the characteristics of those notifications, in accordance with one or more embodiments.

FIG. 2 shows an illustrative diagram of a model that trains itself to compare the user's response times from previous notifications and the characteristics of those notifications, in accordance with one or more embodiments. System 200 includes model 206 which trains itself to compare the user's response times from similar notifications. Model 206 may assess previous notifications pertaining to an action that includes the same attributes. For example, model 206 may identify previous notification 202 which includes time-sensitive and high-risk attributes 218. Model 206 may identify previous notification 202 which includes high-risk attribute 220. Both notifications share the high-risk attribute events and therefore the model may determine that they can be used to predict the user response for actions that share the high-risk attribute (e.g., a missed mortgage payment, a medical emergency, or unpaid credit card debt). For example, the model may compare the user's response times from previous notifications (e.g., the period of elapsed time between time one 210 and time two 212 during previous notification 202 and the period of elapsed time between time one 214 and time two 216 during previous notification 204) and the characteristics of those notifications to better intervene in similar situations in the future and to generate an output (e.g., output 208).

The system may compare the response times in order to determine if a user is willing to engage. For example, the system may determine that a user is willing to engage with the notification when the notification pertains to an action with a time-sensitive attribute. For example, the system may generate a notification for a user that pertains to an overdraft warning. The user may respond quickly to the notification. The system may ascertain that the user may respond quickly to actions with a time-sensitive attribute.

The system may compare the user's response times in order to determine how interested the user is in the notification. For example, the system may determine that a user is disinterested in the notification pertaining to an action with a nonessential purchase attribute. For example, the system may generate a notification for a user that pertains to advice regarding reducing nonessential spending. The user may not respond to the notification. The system may ascertain that the user may not respond or respond negatively to actions with a nonessential purchase attribute.

The system may compare the response times in order to determine the communication style of the user. For example, the system may determine that a user is willing to engage with the notification after a certain period when the notification pertains to an action with an unexpected charge attribute. For example, the system may generate a notification for a user that pertains to a large, unexpected purchase. The user may respond after a few hours to the notification with an explanation that the charge was fraudulent or unexpected. The system may ascertain that the user may respond to actions with an unexpected charge attribute after a certain period of time.

The system may compare the response times in order to determine the sense of urgency a user attributes to a notification. For example, the system may determine that a user prioritizes notifications when the notification pertains to an action with a potentially fraudulent transaction attribute. For example, the system may generate a notification for a user that pertains to a potentially fraudulent transaction. The user may respond quickly to the notification. The system may ascertain that the user may respond quickly to actions with a potentially fraudulent transaction attribute.

Output 208 may help the system assess the probability a notification is effective for a specific action. For example, output 208 may include the probability a user does not perform an undesired action if a notification is sent. Output 208 may include the probability a user responds to a notification and in what manner. For example, output 208 may indicate that there is a high probability a user will respond to actions with a potentially fraudulent transaction attribute.

Figure 3:
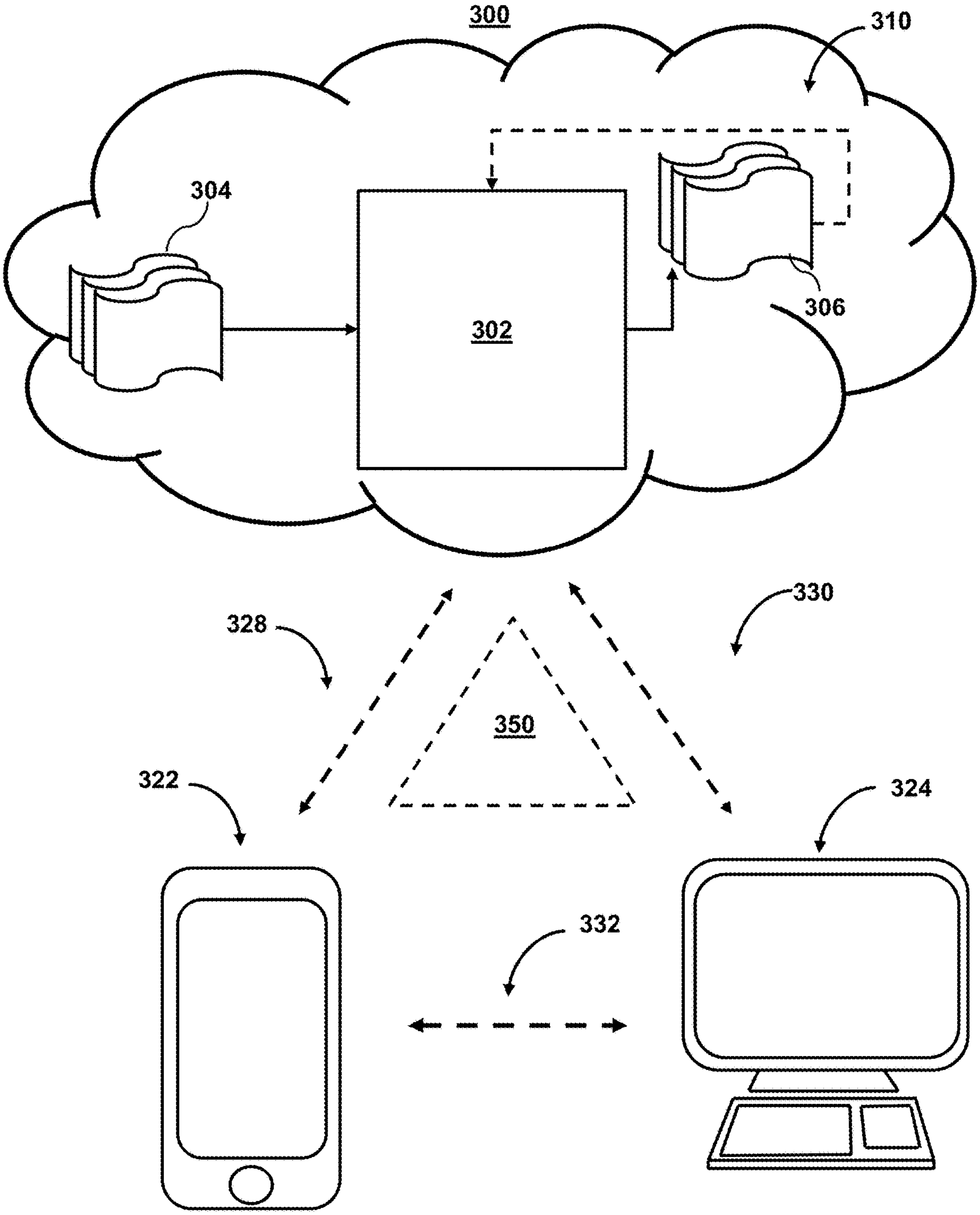
FIG. 3 shows illustrative components for a system used to compare the user's response times from previous notifications and the characteristics of those notifications to better intervene in similar situations in the future, in accordance with one or more embodiments.

FIG. 3 shows illustrative components for a system used to compare the user's response times from previous notifications and the characteristics of those notifications to better intervene in similar situations in the future, in accordance with one or more embodiments. For example, FIG. 3 may show illustrative components for anticipating undesirable actions such as an individual who overspends on nonessential items or accrues too much debt. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and personal computer, these displays also act as user input interfaces. It should be noted that in some embodiments, the devices may have neither user input interfaces nor displays, but they may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a server (e.g., server 104) that receives an action from a user device (e.g., user device 102). Cloud components may include a model (e.g., artificial intelligence model 106) to generate a feature input for an artificial intelligence model. Cloud components 310 may include previous user responses to notifications (e.g., previous notification 202 or previous notification 204).

Cloud components 310 may access actions from a user device (e.g., user device 102), and additional data from a user device (e.g., user-provided data such as communication, location, or motion data). Cloud components may access previous user responses to notifications (e.g., previous notification 202 or previous notification 204).

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., the likelihood a user is going to perform an undesirable action, the likelihood that the user will respond positively to a notification, or the likelihood that the user will respond negatively to a notification).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., likely to respond, likely to ignore, likely to respond positively, likely to respond negatively, likely to not perform undesired action, or likely to perform undesired action).

In some embodiments, the model (e.g., model 302) may automatically perform actions based on outputs 306. In some embodiments, the model (e.g., model 302) may not perform any actions. The output of the model (e.g., model 302) may be used to compare with a threshold to determine if a notification should be generated or not. For example, based on the output, the system may identify that generating a notification for the user for a specific action will likely result in a response within one hour. The system may compare the one hour estimate to the threshold and determine that a notification should be generated.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
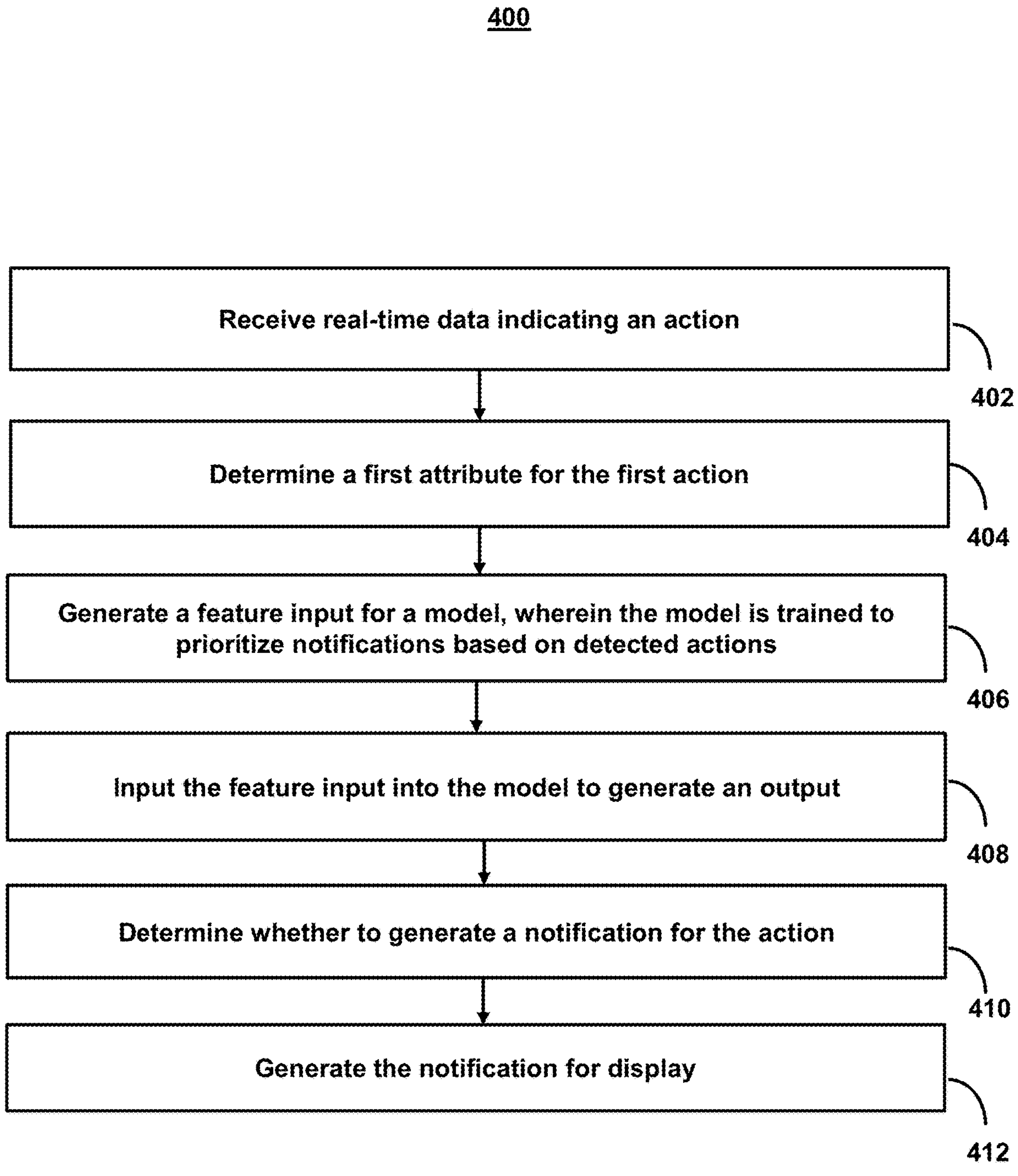
FIG. 4 shows a flowchart of the steps involved in comparing the user's response times from previous notifications and the characteristics of those notifications to better intervene in similar situations in the future, in accordance with one or more embodiments.

FIG. 4 shows a flowchart of the steps involved in comparing the user's response times from previous notifications and the characteristics of those notifications to better intervene in similar situations in the future, in accordance with one or more embodiments. For example, the system may use process 400 (e.g., as implemented on one or more system components described above) in order to enable a resource management communications platform to intervene at opportune moments to reduce the likelihood that a user performs an undesirable action while also minimizing inconvenience to the user.

At step 402, process 400 (e.g., using one or more components described above) receives real-time data indicating an action. For example, the system may receive first real-time data indicating a first action. For example, the system may receive data from a financial institution associated with a user that indicates a first action from the user that the user's credit card is now maxed out. By receiving real-time data indicating an action, the system may be able to intervene in real-time to mitigate undesirable consequences, thereby reducing the risk that an undesirable consequence occurs due to a lack of system intervention.

At step 404, process 400 (e.g., using one or more components described above) determines an attribute corresponding to an action. For example, the system may determine a first attribute for the first action. For example, the system may identify a time-sensitive action or a repeated action such as an unnecessary subscription service associated with a first action such as the user's credit card being maxed out. For example, the credit card may be maxed out because the user forgot about a recurring subscription. By determining a first attribute for the first action, the system may dynamically adapt based on attributes pertaining to the first action thereby ensuring that the intervention is appropriate relative to the undesirable consequence.

At step 406, process 400 (e.g., using one or more components described above) generates a feature input for a model, wherein the model is trained to prioritize notifications based on detected actions. For example, the system may generate a feature input for an artificial intelligence model, wherein the feature input is based on the first attribute, and wherein the artificial intelligence model is trained to prioritize notifications based on detected actions based on a comparison of inputted attributes and user response times to the notifications corresponding to the inputted attributes. For example, the system may identify a recurring subscription and use that as a feature input for the artificial intelligence model. The artificial intelligence model may assign a high priority based on the user's maxed-out credit card, the user's potentially forgotten recurring subscription, and the user's response time in the past to notifications corresponding to situations involving a potentially forgotten recurring subscription. As another example, the system may identify a time-sensitive purchase and use that as a feature input for the artificial intelligence model. The artificial intelligence model may assign a high priority based on the user's intent to purchase a new car tomorrow, the time-sensitive nature of the purchase, and the user's response time in the past to time-sensitive notifications. For example, in the past, the user may have responded to time-sensitive notifications best when pinged three times in one hour if the purchase is urgent. By generating a feature input for a model, the system may ensure that it can prioritize multiple actions from the user simultaneously thereby, reducing the likelihood that the system becomes overwhelmed or generates too many notifications which could inconvenience the user.

In some embodiments, the system may train the AI to prioritize notifications based on an average response time corresponding to the first attribute. For example, the system may determine an average response time corresponding to the first attribute, and determine a priority based on the average response time and the first action. For example, the system may determine the priority based on the average response time. If the average response time is very slow, the system may determine that notifications corresponding to the inputted attributes are generally 20% effective. If the first action corresponds to a small purchase, the system may determine that, based on the low severity of the purchase and the low effectiveness, there is a low priority to contact the user. Alternatively, if the first action corresponds to a large purchase, the system may determine that, based on the high severity of the purchase and the low effectiveness, there is a high priority to contact the user. For example, the system may identify a high-cost purchase and identify a slow average response time. Alternatively, the system may identify a low-cost repeated purchase (e.g., daily coffees) and identify a fast average response time. Based on the average response time, the system may alter the priority of generating a notification for display. For example, if the user has a slow average response time and a high-cost purchase, the system may determine a higher priority, as it is more important to contact the user regarding the high-cost purchase than it is to not receive a response. Alternatively, if the user has a fast average response time and a low-cost purchase, the system may determine a lower priority, as it is not as time-sensitive to intervene. By training the AI to prioritize notifications based on an average response time corresponding to the first attribute, the system may accurately determine a notification priority based on the average response time corresponding to the first attribute to ensure that the user is not presented with too many notifications while ensuring that undesired actions are reduced as much as possible.

In some embodiments, the system may train the AI to prioritize notifications based on a rate of change in response times corresponding to the first attribute. For example, the system may determine a rate of change in response times corresponding to the first attribute and determine a priority based on the rate of change in response times and the first action. For example, the system may determine the priority based on the rate of change in response times. If the system generated a notification one year ago and the average response time was very slow, but the system generated a notification one week ago and the average response time was fast, the system may determine that the user is improving in financial management and subsequently may determine a lower priority for actions based on an improved response time from the user. For example, there is a lower priority to generate a notification because when a notification is generated it is more likely that the user will interact with the notification and rectify the problem. By training the AI to prioritize notifications based on a rate of change in response times corresponding to the first attribute, the system may accurately determine a notification priority based on the rate of change in response times corresponding to the first attribute to ensure that the user is not presented with too many notifications, while ensuring that undesired actions are reduced as much as possible.

In some embodiments, the system may train the AI to prioritize notifications based on a frequency of the first action corresponding to the first attribute. For example, the system may determine a frequency of the first action corresponding to the first attribute and determine a priority based on the frequency and the first action. For example, the system may determine the frequency of actions with shared attributes corresponding to an inputted attribute when determining a priority. The system may determine that the frequency at which a user opens new lines of credit correlates to a depreciated credit score, thereby increasing the priority. For example, if the user opens three new credit cards within the span of two weeks, it may be the case that the user will have a lower credit score, thereby increasing the priority. The system may determine that the frequency at which a user pays bills on time correlates to the user making payments on time in the future. For example, if the user who typically pays bills on time missed a payment, there may be a higher priority than a user who routinely misses payments. By training the AI to prioritize notifications based on a frequency of the first action corresponding to the first attribute, the system may accurately determine a notification priority based on the frequency of the first action corresponding to the first attribute to ensure that the user is not presented with too many notifications, while ensuring that undesired actions are reduced as much as possible.

In some embodiments, the system may train the AI to prioritize notifications based on a magnitude of the first action corresponding to the first attribute. For example, the system may determine a magnitude of the first action corresponding to the first attribute and determine a priority based on the magnitude and the first action. For example, the system may take into consideration the magnitude of the first action when determining a priority. For example, the system may take into consideration the percentage of an individual's account balance spent on a single purchase. For example, if a user makes a purchase for 10% of the user's account balance, the priority may be higher than if the user makes a purchase for 0.01% of the user's account balance, which may have a much lower priority. By training the AI to prioritize notifications based on a magnitude of the first action corresponding to the first attribute, the system may accurately determine a notification priority based on the magnitude of the first action corresponding to the first attribute to ensure that the user is not presented with too many notifications, while ensuring that undesired actions are reduced as much as possible.

In some embodiments, the system may train the AI to prioritize notifications based on a number of user inputs received in response to the first notification. For example, the system may determine a number of user inputs received in response to the first notification and determine a priority based on the number of user inputs and the first action. For example, the system may use the number of responses received from a user in response to the generated notification for an action with the same attributes to determine the priority. For example, if a user responded with four follow-up inputs in response to being alerted of a recurring subscription, the system may use this information to determine a priority for an action that also corresponds to a recurring subscription, as it may be more likely that the user responds. Alternatively, if the user did not respond to any generated notification for actions corresponding to the same attributes, the system may lower the priority. For example, if the user doesn't respond when the system generates a notification corresponding to a habitual payment attribute (e.g., daily coffee), the system sets a low priority when an action sharing the habitual payment attribute is identified (e.g., daily taxi). By training the AI to prioritize notifications based on a number of user inputs received in response to the first notification, the system may accurately determine a notification priority based on the number of user inputs received in response to the first notification to ensure that the user is not presented with too many notifications while ensuring that undesired actions are reduced as much as possible.

At step 408, process 400 (e.g., using one or more components described above) inputs the feature input into the model to generate an output. For example, the system may input the feature input into the artificial intelligence model to generate a first output. For example, the system may input the recurring nature of the purchase, the time-sensitive nature of a purchase, or another attribute of the action into the artificial intelligence model to generate an output. The output may include the chance of success if a notification is sent. For example, based on past interactions with the user, pinging the user three times in one hour has a 60% chance of being effective. By inputting the feature input into the model to generate an output, the system may generate an output that may be helpful in determining if a notification should be generated.

At step 410, process 400 (e.g., using one or more components described above) determines whether to generate a notification for the action. For example, the system may determine whether to generate a first notification for the first action based on comparing the first output to a first threshold. For example, the system may determine there is a 60% chance of a notification being effective in altering the behavior or decisions of the user. The system may determine a threshold of 70% to notify the user based on multiple factors, for example, if the user is likely asleep based on the time of day. Based on the comparison of the first output and the first threshold, the system may decide not to send the notification to the user, as the threshold is 70% and the output only indicates 60%. By determining whether to generate a notification for the action, the system may reduce the likelihood a notification will be ineffective or inconvenient to the user while simultaneously reducing the number of undesirable actions the user performs.

In some embodiments, the system may determine a threshold based on the current time and the user response time. For example, the system may determine a current time, determine a user response time corresponding to the current time, and determine the first threshold based on the current time and the user response time. The system may determine that the current time is 3:00 a.m., and the system may also determine that the user response time at 3:00 a.m. is usually very slow. Therefore, the system may determine that the first threshold should be very high for 3:00 a.m. so that the user is not alerted with lower priority actions. By determining a threshold based on the current time and the user response time, the system may avoid generating a notification at an inopportune moment unless the undesired consequence is urgent.

In some embodiments, the system may determine a threshold based on the rate of change of detected actions. For example, the system may determine a rate of change of detected actions and determine the first threshold based on the rate of change of detected actions over a number of periods. The system may determine that there is a low threshold to generate a notification if the user starts performing more of an undesired action. Alternatively, the system may determine that there is a high threshold to generate a notification if the user starts performing less of an undesired action. For example, if a user does not make any large purchases, the threshold for generating a notification may be higher than if the user is making frequent large purchases. By determining a threshold based on the rate of change of detected actions the system may adaptively react to changes in a user's behavior, thereby reducing the risk of inconveniencing the user.

In some embodiments, the system may determine a threshold based on local user-provided communication. For example, the system may determine an upcoming user action based on local user-provided communication and determine the first threshold based on the upcoming user action. For example, the system may determine an upcoming user action and determine the first threshold accordingly. For example, the system may retrieve a message from a messaging application that reads "I am going to purchase the jacket, even though it is probably expensive and unnecessary." The system may use natural language processing to identify the keywords "going to," "purchase," "expensive," and "unnecessary." The system may use the identified keywords to search a database comprising keywords and associated actions. The system may determine that the user is about to make an unnecessary and expensive purchase, based on the action the keywords mapped to in the database. The system may therefore set a low threshold for generating a notification for the user. By determining a threshold based on local user-provided communication, the system may extend the ability to detect undesirable actions from various communication platforms, thereby reducing the likelihood that a user performs an undesirable action.

In some embodiments, the system may determine a threshold based on the tone corresponding to the notification. For example, the system may determine a tone corresponding to a notification associated with the first action and determine the first threshold based on the tone corresponding to the notification. For example, the system may generate a notification for a user recommending canceling a streaming service subscription. The user may respond negatively to the suggestion. Based on the reaction, the system may determine a high threshold for future notifications corresponding to the first action. By determining a threshold based on the tone corresponding to the notification, the system may dynamically adapt to a user's perception of the notification, thereby reducing the likelihood that future notifications inconvenience the user.

In some embodiments, the system may determine a threshold based on the satisfaction metric corresponding to the user action. For example, the system may determine a satisfaction metric corresponding to a user action, wherein the satisfaction metric is derived from user data, and determine the first threshold based on the satisfaction metric corresponding to the user action. For example, the system may use natural language processing or sentiment analysis models to identify a user's satisfaction corresponding to a recent purchase. For example, if a user recently enrolled in a subscription-based streaming platform but has expressed satisfaction with the purchase, the system may generate a high threshold to generate a notification. The system may not notify a user of a poor financial decision if the user is happy with the purchase. By determining a threshold based on the satisfaction metric corresponding to the user action, the system may react to a user's satisfaction corresponding to the notification, which may reduce the probability that future notifications will inconvenience the user.

In some embodiments, the system may determine a threshold based on the location data corresponding to the user action. For example, the system may retrieve location data corresponding to a user action and determine the first threshold based on the location data corresponding to the user action. For example, the system may retrieve location data showing that a user is outside of the country in which the user resides. The system may interpret the abnormal location to mean that a user is on vacation and subsequently may generate a high threshold to notify the user. The system may also use location data to extrapolate additional information, such as where a user is shopping, the local weather, and local events (e.g., a local festival may lead to increased purchases) to inform the threshold for generating a notification. By determining a threshold based on the location data corresponding to the user action, the system may avoid generating notifications when a user is at an atypical location, such as on vacation. By avoiding generating notifications when a user is at an atypical location, the system can reduce the likelihood a user is inconvenienced by a notification.

In some embodiments, the system may determine a threshold based on the gyroscope data and the accelerometer data corresponding to the user action. For example, the system may retrieve gyroscope data and accelerometer data corresponding to a user action and determine the first threshold based on the gyroscope data and the accelerometer data corresponding to the user action. For example, the system may retrieve gyroscope data and accelerometer data from a user device corresponding to a user action. The system may identify activities such as driving, traveling, or working out. Based on the identified activity, the system may generate a high threshold to generate a notification. Alternatively, if the system detects the user is sedentary, the system may generate a lower threshold. By determining a threshold based on the gyroscope data and the accelerometer data corresponding to the user action, the system may avoid interrupting a user at an inopportune moment, reducing the probability a notification will inconvenience a user and increasing the chance the user will be receptive to the notification.

At step 412, process 400 (e.g., using one or more components described above) generates the notification for display. For example, the system may generate for display, on a user interface, the first notification in response to determining that the first output equals or exceeds the first threshold. For example, the system may determine there is an 80% chance of a notification being effective in altering the behavior or decisions of the user. The system wants to be maximally effective and thus the threshold is determined based on factors that impact intervention effectiveness such as weather, time of day, location, etc. For example, the system may determine generating a notification before sunrise may not be as effective as waiting until the afternoon. Therefore, the system may assign a high threshold value for generating a notification before sunrise to allow high-priority events to lead to a notification or prevent low-priority events from inconveniencing the user. For example, the system may determine that conditions corresponding to the user indicate an effective threshold is 70%. Subsequently, the system may determine that the first output exceeds the first threshold and generate a notification for the user with recommendations to reduce the impact of the first action. By generating the notification for display, the system may maximize intervention effectiveness and reduce the chance that a user experiences undesirable consequences as a result of a user's undesirable action.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising receiving first real-time data indicating a first action; determining a first attribute for the first action; generating a feature input for an artificial intelligence model, wherein the feature input is based on the first attribute, and wherein the artificial intelligence model is trained to prioritize notifications based on detected actions based on a comparison of inputted attributes and user response times to the notifications corresponding to the inputted attributes; inputting the feature input into the artificial intelligence model to generate a first output; determining whether to generate a first notification for the first action based on comparing the first output to a first threshold; and generating for display, on a user interface, the first notification in response to determining that the first output equals or exceeds the first threshold.
2. The method of the preceding embodiment, wherein training the artificial intelligence model to prioritize the notifications further comprises: determining an average response time corresponding to the first attribute; and determining a priority based on the average response time and the first action.
3. The method of any one of the preceding embodiments, wherein training the artificial intelligence model to prioritize the notifications further comprises: determining a rate of change in response times corresponding to the first attribute; and determining a priority based on the rate of change in response times and the first action.
4. The method of any one of the preceding embodiments, wherein training the artificial intelligence model to prioritize the notifications further comprises: determining a frequency of the first action corresponding to the first attribute; and determining a priority based on the frequency and the first action.
5. The method of any one of the preceding embodiments, wherein training the artificial intelligence model to prioritize the notifications further comprises: determining a magnitude of the first action corresponding to the first attribute; and determining a priority based on the magnitude and the first action.
6. The method of any one of the preceding embodiments, wherein training the artificial intelligence model to prioritize the notifications further comprises: determining a number of user inputs received in response to the first notification; and determining a priority based on the number of user inputs and the first action.
7. The method of any one of the preceding embodiments, wherein determining the first threshold further comprises: determining a current time; determining a user response time corresponding to the current time; and determining the first threshold based on the current time and the user response time.
8. The method of any one of the preceding embodiments, wherein determining the first threshold further comprises: determining a rate of change of detected actions; and determining the first threshold based on the rate of change of detected actions over a period of time.
9. The method of any one of the preceding embodiments, wherein determining the first threshold further comprises: determining an upcoming user action based on local user-provided communication; and determining the first threshold based on the upcoming user action.
10. The method of any one of the preceding embodiments, wherein determining the first threshold further comprises: determining a tone corresponding to a notification associated with the first action; and determining the first threshold based on the tone corresponding to the notification.
11. The method of any one of the preceding embodiments, wherein determining the first threshold further comprises: determining a satisfaction metric corresponding to a user action, wherein the satisfaction metric is derived from user data; and determining the first threshold based on the satisfaction metric corresponding to the user action.
12. The method of any one of the preceding embodiments, wherein determining the first threshold further comprises: retrieving location data corresponding to a user action; and determining the first threshold based on the location data corresponding to the user action.
13. The method of any one of the preceding embodiments, wherein determining the first threshold further comprises: retrieving gyroscope data and accelerometer data corresponding to a user action; and determining the first threshold based on the gyroscope data and the accelerometer data corresponding to the user action.
14. A tangible, non-transitory, machine-readable medium storing instructions that, when executed by a data processing apparatus, cause the data processing apparatus to perform operations comprising those of any of embodiments 1-13.
15. A system comprising one or more processors; and memory storing instructions that, when executed by the processors, cause the processors to effectuate operations comprising those of any of embodiments 1-13.
16. A system comprising means for performing any of embodiments 1-13.

What is claimed is:

1. A system for generating time-sensitive notifications based on real-time data that reduces inconvenience to users, the system comprising:

one or more processors; and a non-transitory, computer-readable medium comprising instructions that, when executed by the one or more processors, cause operations comprising:

processing a first application programming interface ("API") call to generate a feature input for an artificial intelligence model, wherein the feature input is based on a first attribute of a first action, and wherein the artificial intelligence model is trained to generate notification predictions for detected actions based on a comparison of inputted attributes and user response times to notifications corresponding to the inputted attributes by:

retrieving model feedback based on the notification predictions; and updating a model configuration based on the model feedback;

inputting the feature input into the artificial intelligence model to generate a first output;

calculating a user response time corresponding to a current time;

determining a first threshold based on the current time and the user response time;

determining whether to generate a first notification for the first action based on comparing the first output to the first threshold; and processing a second API call to generate for display, on a user interface, the first notification in response to determining that the first output equals or exceeds the first threshold.

2. A method for generating time-sensitive notifications based on real-time data that reduces inconvenience to users, the method comprising:

generating a feature input for an artificial intelligence model, wherein the feature input is based on a first attribute of a first action, and wherein the artificial intelligence model is trained to generate notification predictions for detected actions based on a comparison of inputted attributes and user response times to notifications corresponding to the inputted attributes by:

retrieving model feedback based on the notification predictions; and updating a model configuration based on the model feedback;

inputting the feature input into the artificial intelligence model to generate a first output;

calculating a user response time corresponding to a current time;

calculating a first threshold based on the current time and the user response time;

determining whether to generate a first notification for the first action based on comparing the first output to the first threshold; and generating for display, on a user interface, the first notification in response to determining that the first output equals or exceeds the first threshold.

3. The method of claim 2, wherein training the artificial intelligence model to prioritize the notifications further comprises:

determining an average response time corresponding to the first attribute; and determining a priority based on the average response time and the first action.

4. The method of claim 2, wherein training the artificial intelligence model to prioritize the notifications further comprises:

determining a rate of change in response times corresponding to the first attribute; and determining a priority based on the rate of change in response times and the first action.

5. The method of claim 2, wherein training the artificial intelligence model to prioritize the notifications further comprises:

determining a frequency of the first action corresponding to the first attribute; and determining a priority based on the frequency and the first action.

6. The method of claim 2, wherein training the artificial intelligence model to prioritize the notifications further comprises:

determining a magnitude of the first action corresponding to the first attribute; and determining a priority based on the magnitude and the first action.

7. The method of claim 2, wherein training the artificial intelligence model to prioritize the notifications further comprises:

determining a number of user inputs received in response to the first notification; and determining a priority based on the number of user inputs and the first action.

8. The method of claim 2, wherein determining the first threshold further comprises:

determining a rate of change of detected actions; and determining the first threshold based on the rate of change of detected actions over a period of time.

9. The method of claim 2, wherein determining the first threshold further comprises:

determining an upcoming user action based on local user-provided communication; and determining the first threshold based on the upcoming user action.

10. The method of claim 2, wherein determining the first threshold further comprises:

determining a tone corresponding to the notification associated with the first action; and determining the first threshold based on the tone corresponding to the notification.

11. The method of claim 2, wherein determining the first threshold further comprises:

determining a satisfaction metric corresponding to a user action, wherein the satisfaction metric is derived from user data; and determining the first threshold based on the satisfaction metric corresponding to the user action.

12. The method of claim 2, wherein determining the first threshold further comprises:

retrieving location data corresponding to a user action; and determining the first threshold based on the location data corresponding to the user action.

13. The method of claim 2, wherein determining the first threshold further comprises:

retrieving gyroscope data and accelerometer data corresponding to a user action; and determining the first threshold based on the gyroscope data and the accelerometer data corresponding to the user action.

14. A non-transitory, computer-readable medium having instructions recorded thereon that when executed by one or more processors cause operations comprising:

generating a feature input for an artificial intelligence model, wherein the feature input is based on a first attribute of a first action, and wherein the artificial intelligence model is trained to generate notification predictions for detected actions based on a comparison of inputted attributes and user response times to notifications corresponding to the inputted attributes by:

executing backpropagation to generate model feedback based on the notification predictions; and updating a model configuration based on the model feedback;

inputting the feature input into the artificial intelligence model to generate a first output;

calculating a user response time corresponding to a current time;

calculating a first threshold based on the current time and the user response time;

determining whether to generate a first notification for the first action based on comparing the first output to the first threshold; and generating for display, on a user interface, the first notification in response to determining that the first output equals or exceeds the first threshold.

15. The non-transitory, computer-readable medium of claim 14, wherein training the artificial intelligence model to prioritize the notifications further comprises:

determining a number of user inputs received in response to the first notification; and determining a priority based on the number of user inputs and the first action.

16. The non-transitory, computer-readable medium of claim 14, wherein determining the first threshold further comprises:

determining a rate of change of detected actions; and determining the first threshold based on the rate of change of detected actions.

17. The non-transitory, computer-readable medium of claim 14, wherein determining the first threshold further comprises:

determining an upcoming user action by:

retrieving a local user-provided communication;

identifying a plurality of keywords using natural language processing, wherein the plurality of keywords is a subset of the local user-provided communication; and searching for the plurality of keywords in a keyword database, wherein the keyword database comprises a plurality of known keywords and a plurality of corresponding actions; and determining the first threshold based on the upcoming user action.

18. The non-transitory, computer-readable medium of claim 14, wherein determining the first threshold further comprises:

determining a tone corresponding to the first notification associated with the first action by:

identifying a response to the first notification, wherein the response to the notification comprises a user message; and using a sentiment analysis model to identify the tone corresponding to the response; and determining the first threshold based on the tone corresponding to the first notification.

* * * * *